United States Patent [19]

Boyadjieff et al.

[11] Patent Number: 4,535,852
[45] Date of Patent: Aug. 20, 1985

[54] DRILL STRING VALVE ACTUATOR

[75] Inventors: George I. Boyadjieff, Anaheim; Igor Krasnov, Fountain Valley, both of Calif.

[73] Assignee: Varco International, Inc., Orange, Calif.

[21] Appl. No.: 565,702

[22] Filed: Dec. 27, 1983

[51] Int. Cl.³ .................... E21B 21/10; E21B 34/16; F16K 31/00
[52] U.S. Cl. .................... 175/170; 175/218; 166/332; 251/340
[58] Field of Search ............... 175/170, 85, 218, 315, 175/195; 251/58, 249, 340; 166/332, 331, 85; 92/138

[56] References Cited

U.S. PATENT DOCUMENTS

| | | | |
|---|---|---|---|
| 3,507,192 | 4/1970 | Stokke | 92/138 |
| 3,877,529 | 4/1975 | Litchfield | 175/218 |
| 3,887,161 | 6/1975 | Kubelka, Jr. | 175/218 |
| 3,915,244 | 10/1975 | Brown | 175/85 |
| 3,941,348 | 3/1976 | Mott | 175/218 |
| 4,170,169 | 10/1979 | Shafer | 92/138 |
| 4,417,600 | 11/1983 | Kohn | 175/218 |
| 4,421,171 | 12/1983 | Haynes | 166/331 |
| 4,456,217 | 6/1984 | Winegeart et al. | 251/58 |

OTHER PUBLICATIONS

Hydril, "Kelleyguard", bulletin 6506.
International Tool Company, advertising sheet, p. 3515.
Varco, drawing #71840.

Primary Examiner—Stephen J. Novosad
Assistant Examiner—Bruce M. Kisliuk
Attorney, Agent, or Firm—William P. Green

[57] ABSTRACT

An actuator for opening and closing a valve connected into a tubular element at the upper end of a drill string, to close off the flow of fluid through the element, and including a sleeve about the tubular element movable upwardly and downwardly relative thereto and mechanism carried by the sleeve for pivoting a valve actuating member to open and close the valve upon upward and downward movement of the sleeve. The specified mechanism preferably includes a part which interfits with the valve actuating member in a manner pivoting it upon upward and downward movement of the sleeve, but which desirably moves out of that interfitting relation in the extreme upper and lower positions of the sleeve to enable manual actuation of the valve in those positions without interference by the actuating mechanism. The apparatus also may be operable to yieldingly urge the pivoting valve actuating member as far as it can turn in the fully opened and fully closed positions of the valve in order to always assure complete opening or closing of the valve even when some of the parts may have become worn.

21 Claims, 16 Drawing Figures

DRILL STRING VALVE ACTUATOR

BACKGROUND OF THE INVENTION

This invention relates to the actuation of valves which are connected into tubular elements at the upper end of a drill string, to close off the flow of fluid through the tubular element, either for the purpose of preventing upward flow of fluid from the well under blowout conditions, or to retain a quantity of drilling fluid in a top drive drilling unit or the like when it is detached from the remainder of the string.

Valves of this type at the upper end of a drill string usually include a ball valve element containing a passage through which fluid can flow in one condition of the valve but which is closed when the ball is turned through 90°. There have heretofore been proposals for powered actuation of such a valve by one or more piston and cylinder mechanisms connected to a structure at the upper end of the drill string and coacting with other parts for pivoting the valve between open and closed positions. In one prior arrangement, a rack actuated by a piston and cylinder mechanism engages a pinion attached to the valve to turn it. In another prior expedient, a piston and cylinder mechanism acutates a sleeve about the valve upwardly and downwardly, with the sleeve functioning to swing a crank arm connected to the valve.

SUMMARY OF THE INVENTION

A purpose of the present invention is to provide an improved powered actuator for opening and closing a valve of the above discussed general type in a tubular element at the upper end of a drill string, and which actuator is more positive and reliable in its operation than prior arrangements intended to serve the same function. An advantage of a device embodying the invention resides in its capacity for continuously urging the valve in either its closed or open position to a condition in which any slight play which may develop in the valve operating mechanism as a result of wear is taken up or compensated for completely, thus assuring movement of the valve element to a fully open or fully closed position, and continuous maintenance of the element in such a fully actuated position on each operation of the device. Further, the actuator is constructed to enable manual overriding of the powered valve actuating mechanism, in either the open or closed position of the valve, so that regardless of which position the valve is in it may be manually actuated to the other position without interference by the powered operating mechanism. Additionally, these and other functional advantages of the actuator are attained with a minimum of structure, adapted to be provided at relatively low cost but capable of operating reliably over a very long useful life.

Structurally, an actuator constructed in accordance with the invention includes a member which is mounted at the outside of the tubular element containing the valve, and which pivots about a predetermined axis to open and close the valve. This member preferably takes the form of a swinging arm, and is moved by an actuating part or structure interfitting with the member and movable relative to the tubular element to swing the member about its axis. The movement of the actuating part may be upwardly and downwardly, that is, parallel to the axis of the tubular element and the fluid passage extending therethrough. At the upper and lower ends of its range of travel, this actuating part may move out of its interfitting relationship with the pivoting member or arm, in a manner avoiding interference by that actuating part with manual operation of the valve. Upon movement of the actuating part from one of its extreme positions toward the other extreme position, the part first moves into its interfitting relationship with respect to the pivoting member, then swings that member about its axis to a changed position of the valve, and then moves out of the interfitting relationship to again in the changed condition avoid interference with manual actuation of the valve.

To assure full movement of the valve to either its open or closed position, a yieldingly urged camming structure is provided for acting against the pivotal member in both of its extreme positions, and in each condition swinging the member and control valve as far as is necessary to move the valve to and maintain it in the fully actuated condition. This cam structure may take the form of a part spring urged toward the axis about which the pivoting member turns, and containing a recess into which the member projects, with that recess having cam surfaces at its upper and lower ends engageable by the arm at the end of its range of travel in either direction. The actuating part which interfits with the pivoting member may be a lug or pin projecting into a recess formed in the end of the pivoting member and movable out of that recess at the end of the range of movement of the parts. The camming structure and the actuating part which interfits with the pivoting member may both be carried by a sleeve disposed about the tubular element which contains the valve, which sleeve is actuable upwardly and downwardly by a piston and cylinder mechanism or other power unit, desirably through a lever mechanism.

An additional feature of the invention resides in the manner in which a piston and cylinder mechanism for operating a valve actuating sleeve may be supported at the lower end of a top drive drilling unit. More particularly, an elongated support member may be provided at the underside of the top drive drilling unit and project downwardly beneath the housing of that unit, with this support member carrying a first piston and cylinder mechanism which suspends and can actuate upwardly and downwardly a torque wrench adapted to make and break a connection of the drill string, and with the elongated support member also carrying at least one additional piston and cylinder mechanism which functions to actuate upwardly and downwardly a sleeve or other structure carried at the outside of the valve assembly and movable upwardly and downwardly relative thereto to open and close the valve.

BRIEF DESCRIPTION OF THE DRAWINGS

The above and other features and objects of the invention will be better understood from the following detailed description of the typical embodiment illustrated in the accompanying drawings in which.

DESCRIPTION OF THE PREFERRED EMBODIMENT

Figure 1:
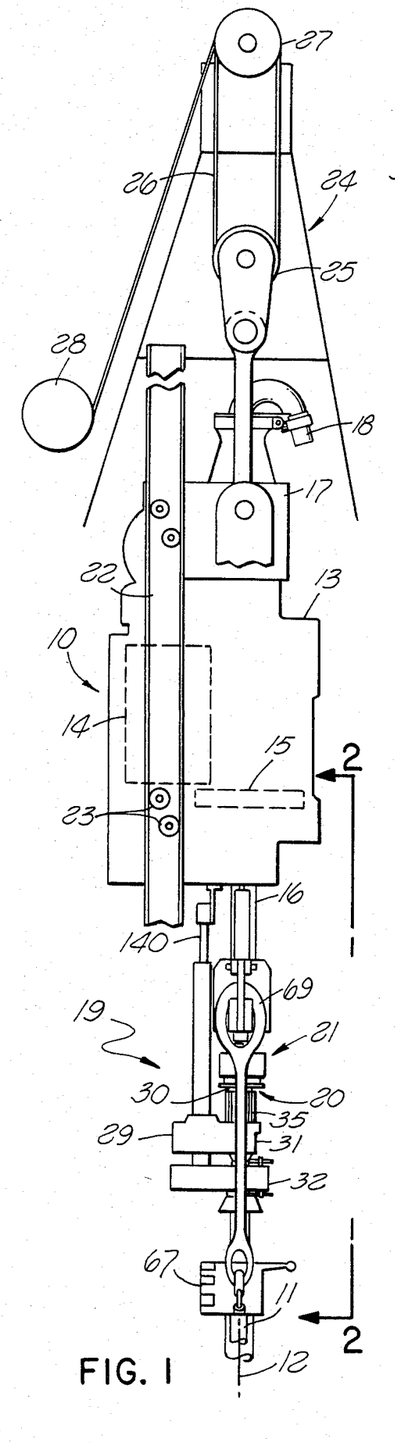
FIG. 1 is a partially diagrammatic representation of a top drive well drilling rig having a valve actuator embodying the invention.

In FIG. 1, there is represented at 10 a top drive well drilling unit which is connected to the upper end of a tubular drill string 11 and drives it rotatively about an axis 12 to drill a well. The top drive unit 10 is somewhat diagrammatically represented as including a housing 13 containing a motor 14 which acts through a gear train represented at 15 to drive a tubular element 16 connected to the upper end of the drill string. A swivel 17 is connected to the upper end of the housing of top drive unit 10 to conduct drilling fluid from a supply line 18 downwardly into the upper end of the tubular element 16 for delivery therethrough to the drill string. A pipe handling assembly 19 is connected to the underside of top drive unit 10 to make and break connections between different sections of drill string 11. A valve unit 20 is connected into the string beneath tubular element 16 which is driven by motor 14, with this valve unit being actuable between an open and closed condition by an actuator 21 embodying the present invention.

Top drive unit 10 is mounted by two parallel vertical rails or tracks 22 for upward and downward movement along the vertical axis 12 of the drill string and well. For this purpose, the top drive unit has a number of rollers 23 engaging the two tracks 22 as represented in FIG. 1, to guide the unit for the desired upward and downward movement. As represented diagrammatically in the upper portion of FIG. 1, the swivel 17 and top drive unit 10 are suspended within a derrick 24 from a traveling block 25 which is connected by line 26 to a crown block 27 at the upper end of the derrick, and with the line being actuable by drawworks 28 to raise and lower the drilling unit and swivel and the connected drill string and pipe handling assembly 19. Tracks 22 may be welded or otherwise secured rigidly to the derrick in stationary positions to effectively guide the top drive unit and other parts for the desired movement.

Figure 3:
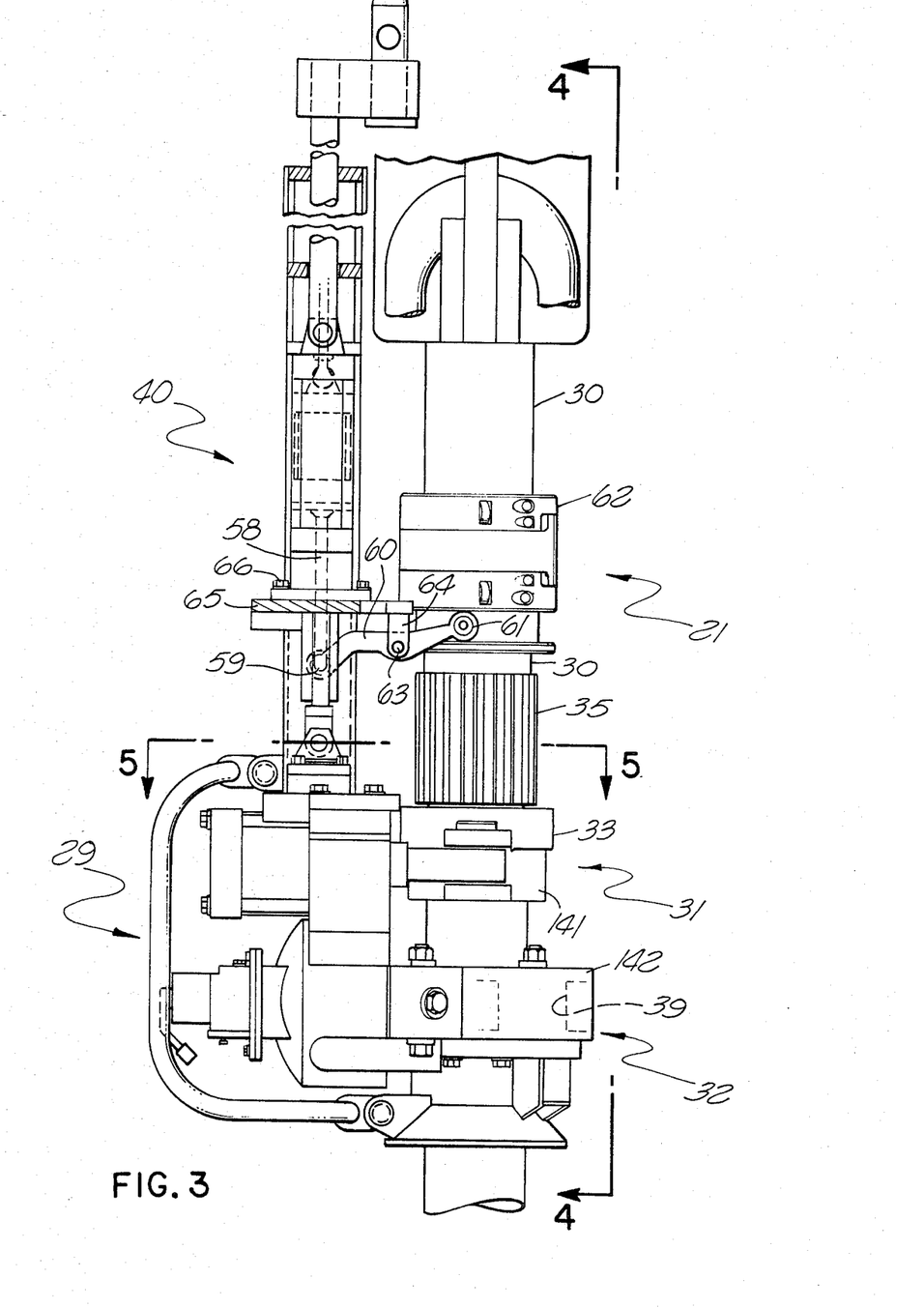
FIG. 3 is an enlarged partially sectional view taken essentially on line 3—3 of FIG. 2.
Figure 4:
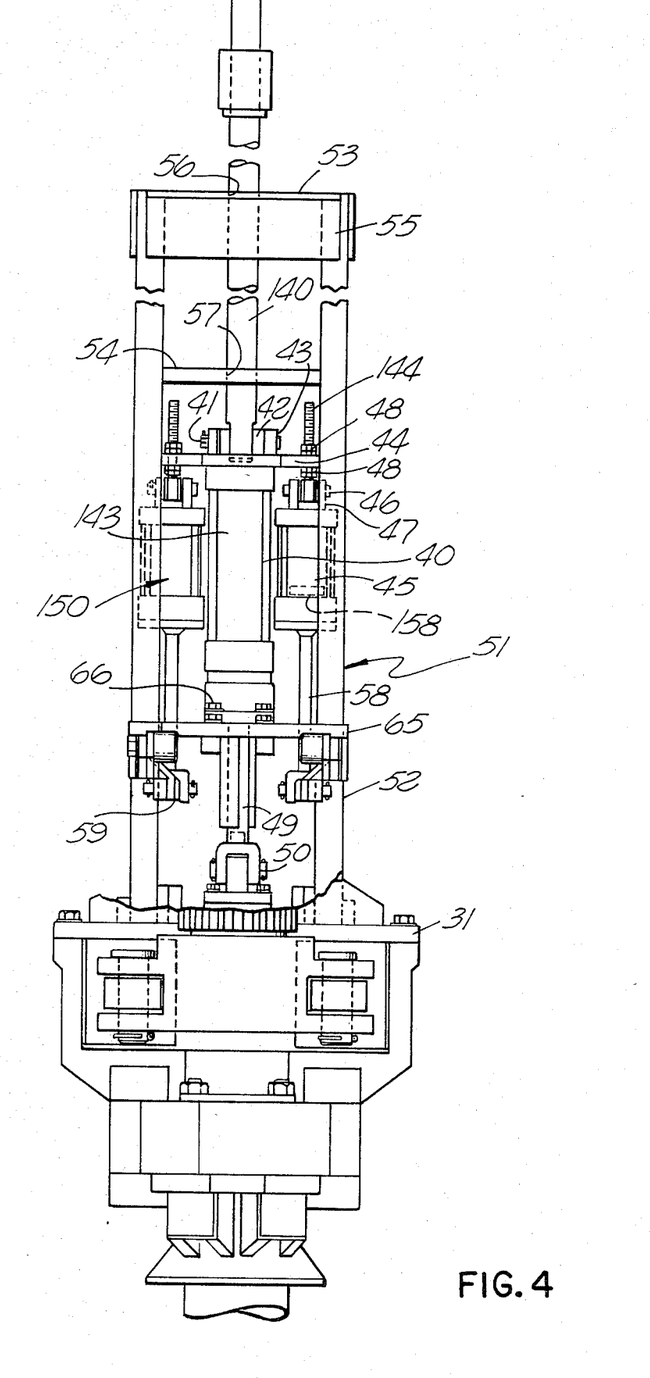
FIG. 4 is a front elevational view taken on line 4—4 of FIG. 3, but with certain portions of the apparatus eliminated to simplify and clarify the illustration.
Figure 5:
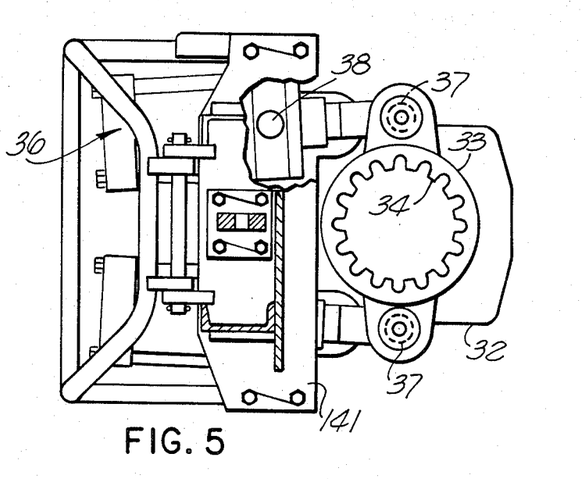
FIG. 5 is a horizontal section on line 5—5 of FIG. 3.

The pipe handling assembly may be similar to that shown and described in copending U.S. patent application Ser. No. 6/404,896 entitled "Drilling Of Wells With Top Drive Unit" filed Aug. 3, 1982 by George I. Boyadjieff. Assembly 19 includes a torque wrench 29, which may be essentially the same as the torque wrench shown in the above identified prior application, and which is movably suspended from a rod 140 connected directly or indirectly to the housing 13 of top drive unit 10 and projecting downwardly therefrom. The torque wrench is operable to unscrew the tubular body 30 of valve unit 20 from an upper section of the drill string 11 therebeneath, with body 30 being engaged by an upper section 31 of the torque wrench, and with the drill string beneath body 30 being engaged and gripped by a lower section 32 of the torque wrench. To engage and rotate body 30 of the valve assembly, the upper section 31 of the torque wrench has an element 33 containing internal splines 34 which are engageable with splines 35 formed on the lower end of body 30. In the FIG. 3 position of the parts, the splines 34 are located beneath the lower ends of the splines 35 of body 30, and consequently the drill string is free to rotate without interference by the torque wrench. When the torque wrench is actuated upwardly by a piston and cylinder mechanism 40 (FIG. 4) the splines 34 and 35 engage one another, and rotation of element 33 is then transmitted to body 30 of the valve assembly. Element 33 is turned by two piston and cylinder mechanisms 36 of the upper section 31 of the torque wrench, with the pistons of these mechanisms being connected pivotally to element 33 at 37, and with the cylinders of mechanisms 36 being connected pivotally to a body 141 of section 31 of the torque wrench at two locations 38. The lower section 32 of the torque wrench has its body 142 rigidly connected to the body 141 of the upper section, for movement upwardly and downwardly therewith, with body 142 containing jaws represented at 39 which are actuable relative to one another by a piston contained within body 142 to grip the upper end of a top section of the drill string 11 and retain that section against rotation when valve body 30 is turned by element 33 of the top section of the torque wrench.

The cylinder 143 of piston and cylinder mechanism 40 is suspended from the lower end of rod 140 by a connector pin 41 extending through registering openings in the lower end of rod 140 and in two connector lugs 42 projecting upwardly from the upper end of the cylinder. This pin 41 also extends through openings in two upwardly projecting connector lugs 43 secured to a horizontal rigid plate 44 which projects laterally in opposite directions from the rod. This plate 44 is in turn connected to the cylinders 45 of two additional piston and cylinder mechanisms 150, by pins 46 extending horizontally through registering openings in connector lugs 47 at the upper ends of the cylinders and in the lower eye ends of two connector screws 144 which project upwardly through plate 44 and are fixed relative thereto by nuts 48. The piston rod 49 of piston and cylinder mechanism 40 is connected to body 141 of the upper section 31 of the torque wrench by an attaching pin 50 (FIG. 4), so that the entire torque wrench can be actuated upwardly and downwardly by mechanism 40.

A rigid framework 51 is attached to body 141 of the upper section of the torque wrench, and includes two parallel vertically extending rigid preferably channel shaped members 52 welded or otherwise rigidly secured to body 141 at their lower ends and projecting upwardly to a location at which a top plate 53 is welded to their upper ends and extends horizontally therebetween. At an intermediate location a second horizontal plate 54 extends between the two members 52 and is rigidly welded or otherwise secured thereto. A vertical plate 55 may interconnect the members 52 near their upper ends to further strengthen the framework 51. Rod 30 extends through and is a close fit within openings 56 and 57 in plates 53 and 54, to slidably engage those plates in a manner guiding framework 51 and the connected torque wrench assembly for upward and downward movement and preventing tilting of the torque wrench during such movement.

The rods 58 of the pistons 158 within cylinders 45 are attached at their lower ends by pivotal connections 59 to first ends of a pair of similar parallel levers 60 whose second ends carry rollers 61 which engage and actuate vertically a sleeve 62 of the valve actuator 21 to move it upwardly and downwardly between open and closed positions of the valve. Levers 60 are pivotally connected at intermediate locations 63 to mounting lugs 64 projecting downwardly from a horizontal rigid plate 65 which is secured rigidly to the lower end of cylinder 143 by bolts represented at 66. This plate 65 of course contains a central passage through which rod 49 projects and within which it is vertically movable.

Figure 2:
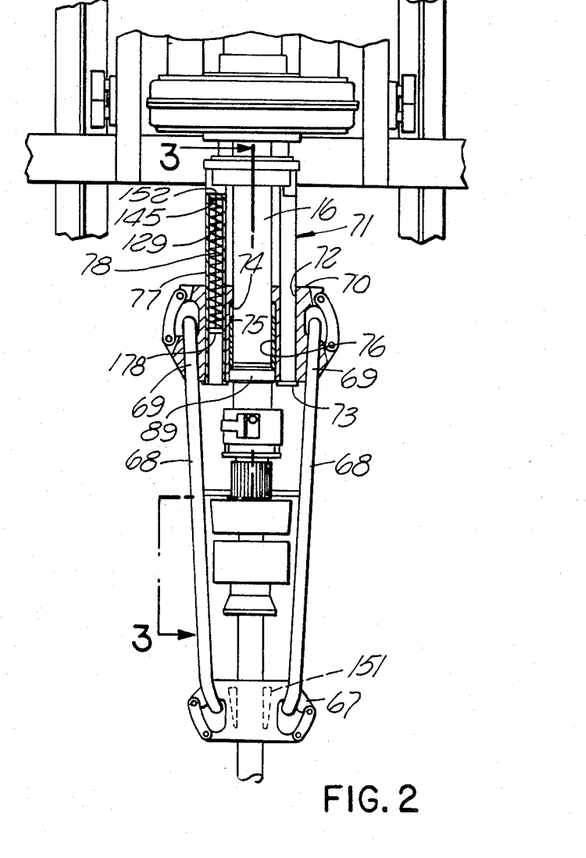
FIG. 2 is a fragmentary front elevational view taken on line 2—2 of FIG. 1.

In addition to the torque wrench, the pipe handler at the underside of top drive unit 10 may include also an elevator 67 (FIGS. 1 and 2) which is adapted to engage and support a section of the drill string, and which for that purpose may contain slips 151 operable to releasably grip the well pipe or contain a shoulder engageable with an enlarged joint of the drill pipe in supporting relation. This elevator 67 is suspended by two links 68 having eyes at their lower ends for connection to the elevator and having second eyes 69 at their upper ends engaging opposite sides of a carrier body 70 which is received about the rotatively driven element 16 of the top drive unit and which is retained against rotation by extension of two parallel vertical torque arrestor assemblies 71 through vertical passages 72 formed in carrier 70, with lower enlarged diameter flanges 73 on torque arrestor assemblies 71 being engageable with the underside of carrier 70 to support it. Assemblies 71 are extensible vertically against the resistance offered by coil springs 145 within these units, so that when the entire weight of the string is suspended by elevator 67 carrier 70 is free to move downwardly to a position in which an internal shoulder 74 therein engages an upwardly facing shoulder 75 on a sleeve 76 carried about and supported by element 16 of the top drive unit. When these shoulders are in engagement, the entire weight of the string is supported directly by element 16 and the remainder of the top drive unit. The extensibility of torque arrestor assemblies 71 may be attained by forming these units to include outer cylindrical housings 77 having flanges 73 at their lower ends for engaging and supporting carrier 70 and containing rods 78 attached at their upper ends to the housing 13 of the top drive unit, with springs 73 bearing upwardly against top walls 152 of tubular elements 77 and downwardly against lower enlargements 178 on rods 78.

Figure 10:
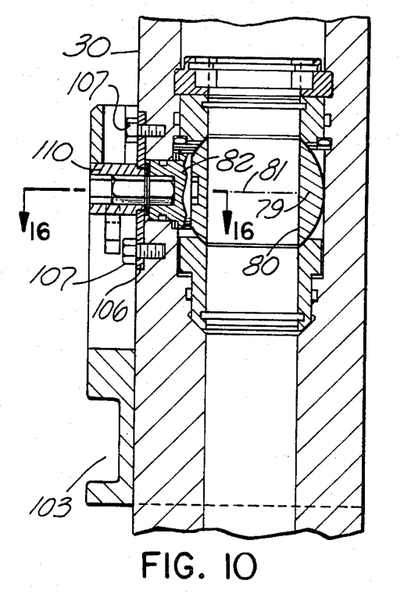
FIG. 10 is a vertical section on line 10—10 of FIG. 9.
Figure 11:
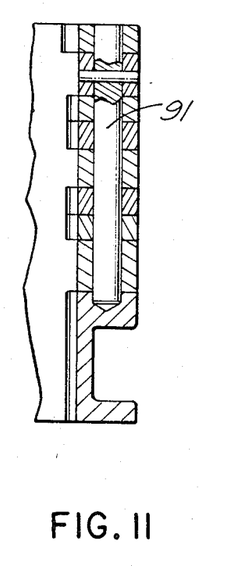
FIG. 11 is a vertical section on line 11—11 of FIG. 7.
Figure 12:
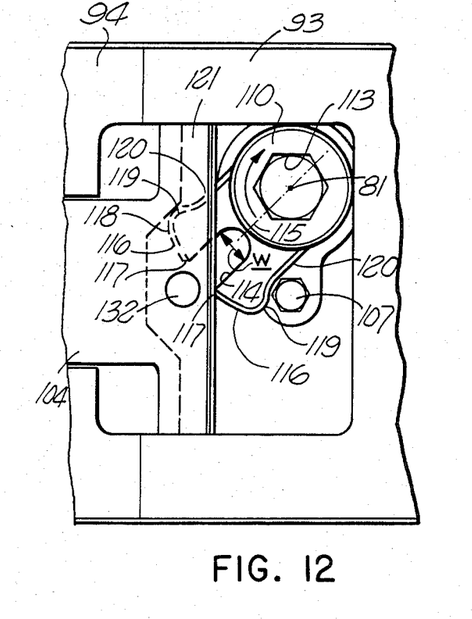
FIGS. 12 through 15 are views representing four different conditions of the valve actuator.
Figure 13:
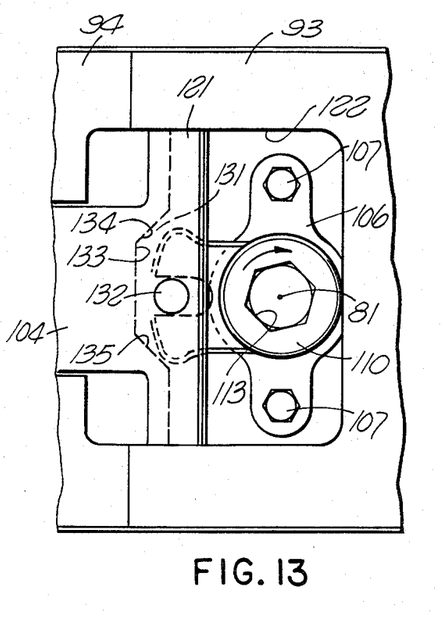

The piston and cylinder mechanisms 150, levers 60 and sleeve 62 about valve assembly 20, in conjunction with various elements carried by and associated with the sleeve, comprize the valve actuator which is identified generally by the number 21 in FIG. 1. The valve assembly 20 which is operated by this actuator includes the previously mentioned tubular body 30 and a conventional ball type valve 79 contained within body 30. Ball 79 contains a cylindrical passage 80 which in the FIG. 10 rotary position of element 79 is aligned with the vertical axis 12 of the drill string and element 30 to pass drilling fluid vertically therethrough. Ball 79 is rotatable about an axis 81 extending perpendicular to and intersecting the main vertical axis 12 of the drill string and body 30, to a position in which passage 80 extends transversely of body 30 and closes off fluid flow upwardly or downwardly therethrough. The ball may be turned through 90° between these two positions by actuation of a shaft 82 keyed to the ball by a hexagonal drive lug on the shaft projecting into a hexagonal recess in the ball at 83. At its outer side, shaft 82 contains a hexagonal socket recess 83 accessible from the outside of body 30.

At its lower end, valve body 30 contains an internal thread 84 to which the drill string is connectable, preferably through a short sub 85 having external threads 86 engaging threads 84 and having external threads at its lower end engageable with the upper section of the drill string. The upper end of valve body 30 may similarly contain internal threads 88 engageable with external threads formed on the lower end of the tubular element 16 of top drive unit 10. Near its upper end, valve body 30 may have an external annular flange 89 having an upwardly facing annular shoulder surface 90 on which the previously mentioned tubular sleeve 76 is supported to apply upward supporting force to carrier 70.

Figure 6:
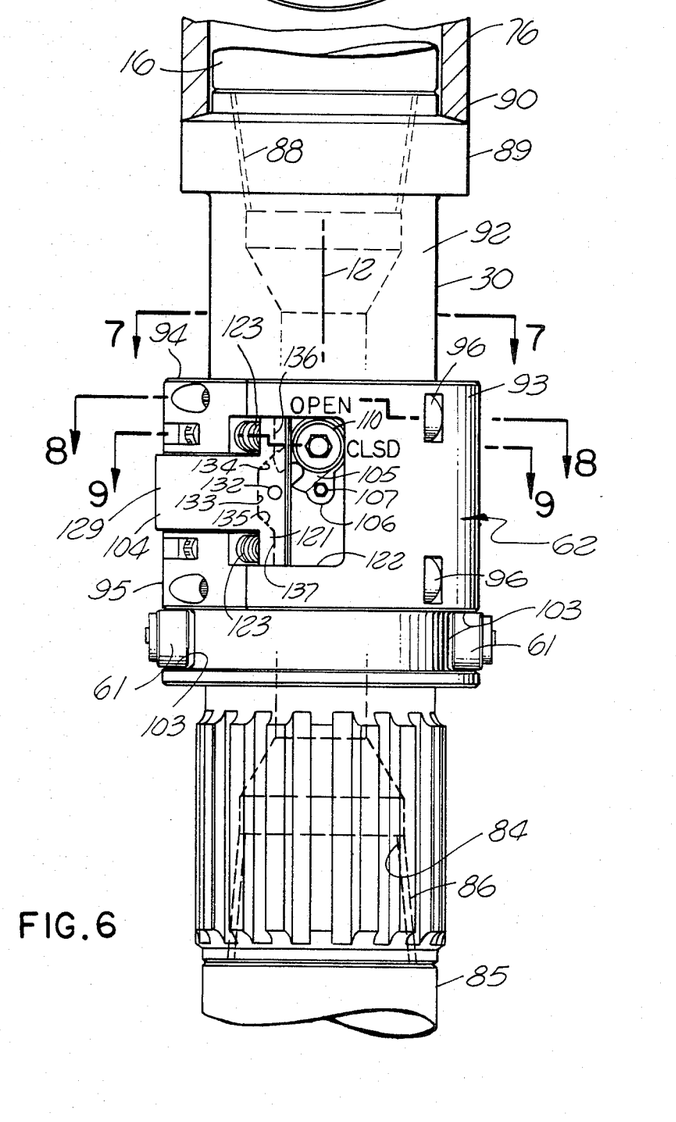
FIG. 6 is an enlarged view corresponding to a portion of FIG. 2.
Figure 7:
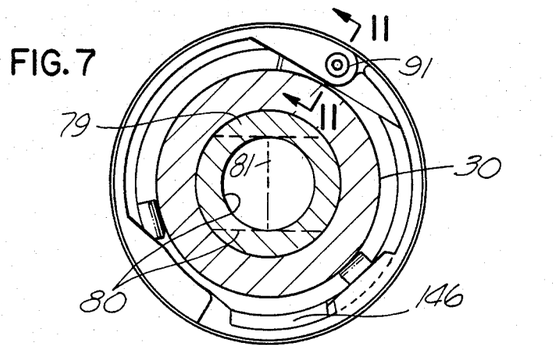
FIGS. 7, 8 and 9 are horizontal sections on lines 7—7, 8—8 and 9—9, respectively, of FIG. 6.
Figure 8:
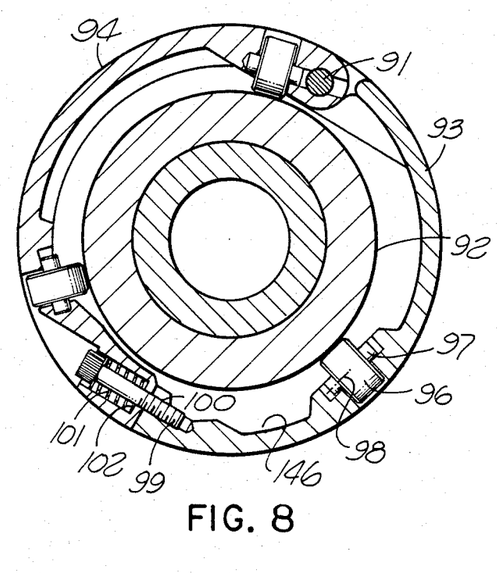
Figure 9:
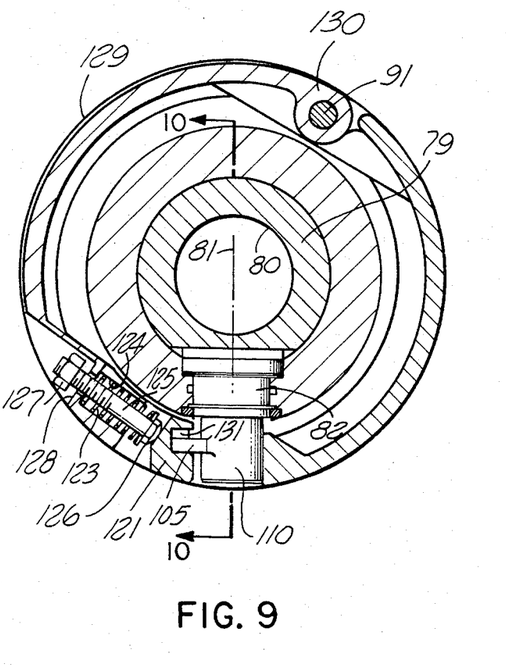

Sleeve 62 of the valve actuator may be formed sectionally of complementary essentially semi-cylindrical elements hinged together by a pin 91 (FIGS. 7, 8, 9 and 11) for opening and closing movement to facilitate placement of the sleeve about the external cylindrical surface 92 of valve body 30. More particularly, the sections of sleeve 62 may include a first essentially semi-cylindrical element 93 connected by pin 91 to a pair of vertically shorter semi-cylindrical sections 94 and 95 (FIG. 6). At their inner sides, these sections may carry rollers 96 mounted by pins 97 for rotation relative to the sections to which they are attached about horizontal axes 98, with the rollers engaging the outer surface of valve body 30 to roll upwardly and downwardly therealong and thereby guide the sleeve for upward and downward shifting movement relative to the valve body. At a location offset 180° from the hinge pin 91, the opposite end of element 93 is connected to the corresponding end of section 94 by a screw 99, which connects threadedly into element 93 at 100, with a coil spring 101 bearing in opposite directions against the head of screw 99 and a shoulder 102 formed on section 94 to yieldingly urge those ends of the parts 93 and 94 toward one another and thereby maintain the rollers 96 in proper closely fitting engagement with the outer surface of valve body 30. A similar screw 99 and coil spring 101 connect ends of element 93 and section 95 together at a location offset circularly 180° from pin 91, with a series of rollers 96 corresponding to those illustrated in FIG. 8 provided within elements 93 and 95 at the level of this second screw 99, to thus maintain the elements 93, 94 and 95 in the assembled tubular condition about valve body 30. This composite sleeve 96 formed by the elements 93, 94 and 95 is actuated upwardly and downwardly by levers 60, by extension of the lever carried rollers 61 into an annular groove 103 formed in the exterior of the lower portion of sleeve 62. This groove may be provided by forming complementary semi-circular grooves of the illustrated crosssection (FIG. 6) in the outer surfaces of sections 93 and 95 of the sleeve.

The upward and downward movement of sleeve 62 is converted to rotary motion of ball valve 79 about its axis 81 by an actuating and camming structure 104 movably carried by sleeve 62 and coacting with a pivotal crank arm or member 105. Member 105 may be movably attached to valve body 30 independently of sleeve 62, by a retaining plate 106 which is secured by two screws 107 to the outer surface of body 30 and which contains an opening 108 within which a slightly reduced diameter portion 109 of an essentially externally cylindrical body 110 carrying crank arm 105 is rotatably received. A snap ring 111 received within a groove at the inner end of body 110 retains that body against movement laterally outwardly away from valve body 30. A hexagonal projection 112 carried by body 110 is received within hexagonal recess 83 in the shaft element 82 of ball valve 79, to transmit rotary motion thereto. At its outer end, body 110 contains a similar hexagonal socket recess 113 into which a wrench is insertable to manually rotate body 110 about its axis 81.

The crank arm 105 carried by body 110 may be welded or otherwise rigidly secured to member 110 or be formed integrally therewith, and projects radially outwardly therefrom perpendicular to axis 81. As viewed in a plane perpendicular to axis 81, the crank arm preferably has the outline configuration illustrated in FIGS. 6 and 12 through 15, to present a notch or recess 114 facing radially outwardly away from axis 81 and essentially along an axis or path 115 extending perpendicular to and radially with respect to axis 81. This notch may be of uniform width w transversely of the radial line 115. At the outer extremity of the crank arm, the sides of notch 114 may meet a pair of outer surfaces 116 of the crank arm at corners 117. These surfaces 116 may extend arcuately about axis 81 from the corners 117 to locations 118, and beyond those points may curve as represented at 119 to merge with opposite side surfaces 120 of the arm.

The actuating and camming structure or member 104 which coacts with and operates crank arm 105 has a vertically extending portion 121 received within a recess or cutaway portion 122 of section 93 of sleeve 62 adjacent crank arm 105 and the member 110 by which it is carried. This portion 121 of member 104 is yieldingly urged to the right as viewed in FIGS. 6 and 9 by two coil springs 123, which are received within recesses 124 formed in the ends of sections 94 and 95, and which are disposed about pins 125 having rounded heads 126 against which the springs bear and which in turn act rightwardly against portion 121 of member 104. At its left end as viewed in FIG. 9, each pin 125 has a nut 127 threadedly connected thereto for engagement with a shoulder surface 128 on the corresponding section 94 or 95 to limit rightward movement of pin 125. Extending leftwardly from its portion 121, member 104 has a portion 129 of reduced vertical width, which extends essentially semicylindrically about valve body 30 and is pivotally connected at its opposite end 130 to pin 91, to thereby allow limited movement of portion 121 toward and away from axis 81.

At its right side, portion 121 of member 104 contains a recess 131, into which the extremity of crank arm 105 projects. At a vertically central location, portion 121 carries an actuating part 132 which may take the form of a cylindrical pin centered about an axis parallel to pivotal axis 81 of the crank arm, and which extends across the width of recess 131. To the left of this actuating pin or part 132, recess 131 has an inner wall 133 which extends vertically or parallel to the main axis 12 of the drill string, and which meets at its upper and lower ends a pair of oppositely inclined cam surfaces 134 and 135 which may be disposed at 45° angles with respect to the vertical and horizontal. At their right ends as viewed in FIG. 6, these inclined cam surfaces 134 and 135 meet a pair of vertical surfaces 136 and 137 which are aligned vertically with one another and form inner walls of upper and lower portions of the recess 131. The dimensions and configuration of the crank shaft and recess 131 in member 104 and related parts are such as to enable the parts to function in the manner described hereinbelow.

During a drilling operation, the ball valve 79 is in its open position to allow drilling fluid to flow downwardly from the swivel and the top drive unit 10 to the drill string, to the location of the bit at the lower end of the string. Sleeve 62 of the valve actuator is in its FIG. 6 position, with the crank arm disposed as shown in that figure, and with actuating pin 132 completely out of and beyond notch 114 in the crank arm. In this condition, cam surface 134 of member 104 is yieldingly urged rightwardly by springs 123 against a side of crank arm 105 to yieldingly urge crank arm 105 and valve 79 rotatively to a position in which the valve is fully open. If any wear develops in the various parts of the actuator, this spring pressed relationship of member 104 and the crank arm will assure that any play which might otherwise develop will be taken out and the ball will be completely open. If it is desired to close the valve, either to prevent upward flow of fluid from the formation, or to prevent loss of circulating fluid downwardly from the top drive drilling unit when the drill string is disconnected therefrom, an operator admits pressure fluid to the upper ends of cylinders 45 (FIG. 4) causing their piston rods 58 to move downwardly in a manner pivoting levers 60 (FIG. 3) about their fulcrum locations 63, to cause rollers 61 carried by the levers to swing upwardly in a manner forcing sleeve 62 upwardly relative to crank arm 105 and valve body 30. As sleeve 62 moves upwardly, it carries member 104 with it, initially moving camming surface 134 away from its position of engagement with a side of crank arm 105, thereby freeing portion 121 of member 104 for slight rightward movement under the influence of springs 123 and to the position represented in FIG. 12. This rightward movement of the head 121 of member 104 positions pin 132 beneath the angularly downwardly facing notch 114 of the crank arm, and to a position in which the axis of cylindrical pin 132 is offset slightly farther to the right than is the corner 117 of the crank arm above the pin. As a result of this relationship, the pin upon further upward movement enters notch 114, and by this interfitting engagement with the crank arm causes the crank arm to swing in a clockwise direction about its axis 81. The diameter of the outer surface of cylindrical pin 132 is just slightly less than the width w of notch 114 so that the pin can be received fairly closely within the notch and still effect the desired pivotal movement of the crank arm. The pin continues its upward movement with the sleeve, and by that movement swings crank arm 105 through 90°, first to the position represented in FIG. 13 and then to the position represented in FIG. 14 in which the pin has moved out of the notch and the lower inclined camming surface 135 of member 104 engages the second side of the crank arm to yieldingly urge the crank arm and valve to the fully closed position of the valve, thus maintaining the valve in that condition even though some of the parts may become worn from use.

Figure 15:
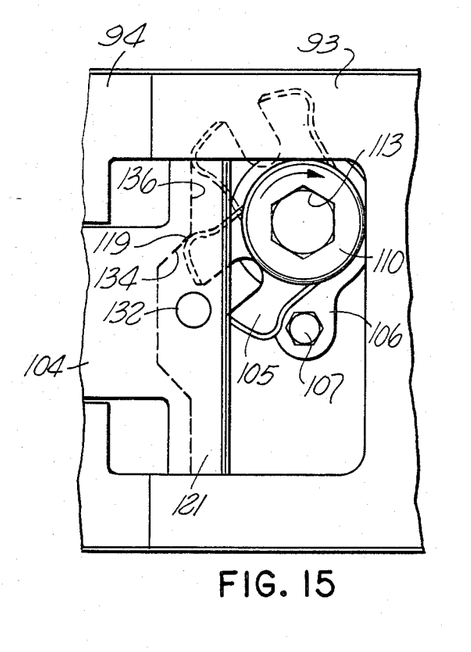
Figure 16:
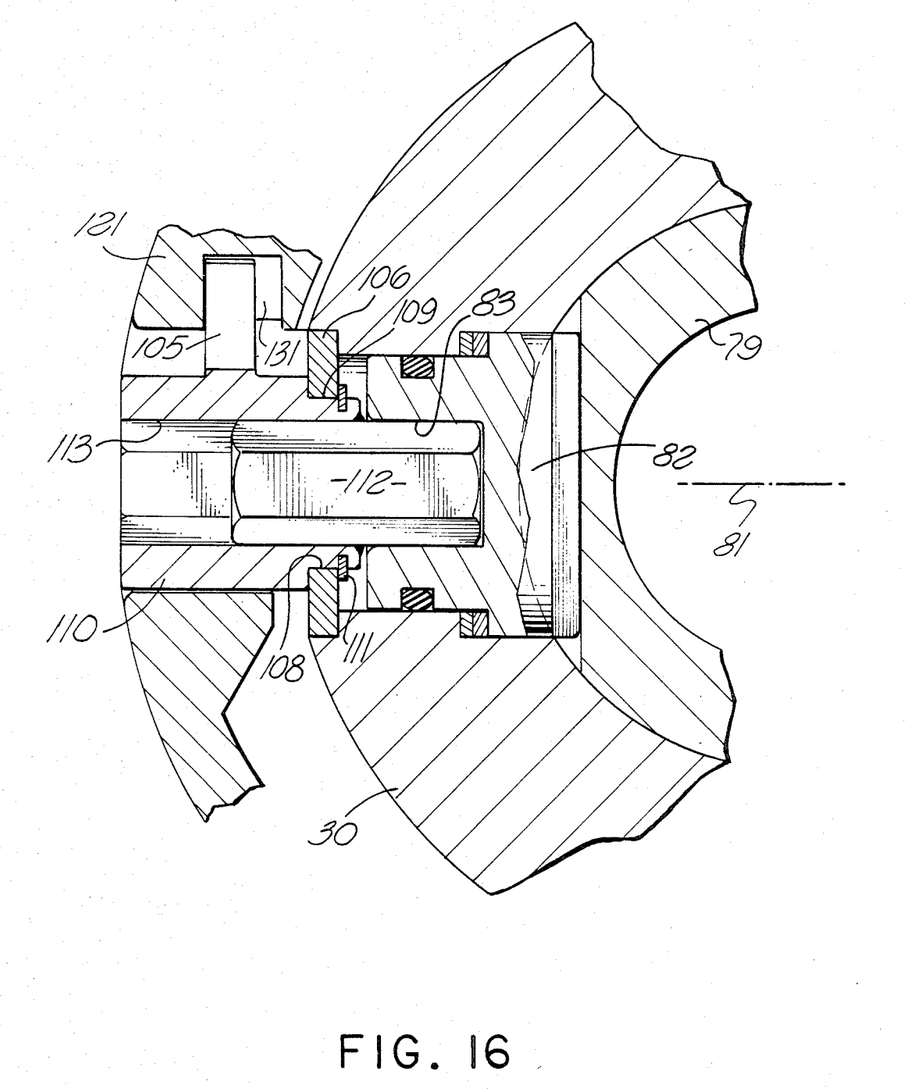
FIG. 16 is an enlarged fragmentary horizontal section taken on line 16—16 of FIG. 10.

If the valve actuator is in the condition of FIG. 6, with the valve open, and it becomes desirable to close the valve manually, an operator inserts an allen wrench into socket recess 113 in the outer end of the member 110 which carries crank arm 105, and forcibly rotates that member and crank arm as well as the connected valve 79 through 90° in a clockwise direction as viewed in FIG. 6, and from the full line position of FIG. 15 to the broken line position of that Figure. Upon the initial portion of this pivotal movement of the crank arm, the upper one of the rounded camming surfaces 119 engages inclined camming surface 134 of member 104 in a relation deflecting portion 121 of member 104 leftwardly a short distance, thereby enabling the crank arm to move into a position of engagement with vertical surface 136 of member 104, so that the crank arm is then free to be turned through 90° and to the broken line position of FIG. 15, with member 104 moving leftwardly against the tendency of springs 123 as required to permit the swinging movement of the crank arm. In the broken line position of FIG. 15, springs 123 act through member 104 to continuously urge the crank arm in a counterclockwise direction maintaining the valve in a fully closed condition.

The crank arm may be swung back to the FIG. 6 position by reverse manual rotary actuation of the crank arm and valve. If it is desired to power actuate the crank arm from the broken line position of FIG. 15 to the open valve condition, this may be attained by first power actuating sleeve 62 upwardly by piston and cylinder mechanisms 150 to a position in which member 104 is in the FIG. 14 condition, with the crank arm remaining in its upwardly inclined condition during such upward movement of the sleeve, and with pin 132 and part 104 being deflected leftwardly as they move upwardly past the crank arm. When the parts reach the FIG. 14 position, sleeve 62 can be returned downwardly by piston and cylinder mechanisms 151, to swing the crank arm from its full line position of FIG. 14 to its broken line position of that figure. During the initial downward movement of the sleeve, camming surface 135 moves out of engagement with the crank arm, allowing the portion 121 of member 104 to move rightwardly a short distance as in FIG. 12, thus positioning the pin 132 far enough to the right to enter notch 114 in the crank arm and pivot the crank arm in a counterclockwise direction to the position of FIG. 6. As mentioned previously, in either the FIG. 6 position or the FIG. 14 position, engagement of camming surface 134 or 135 with the crank arm causes continual spring urged actuation of the crank arm and valve to its fully open or fully closed position.

Figure 14:
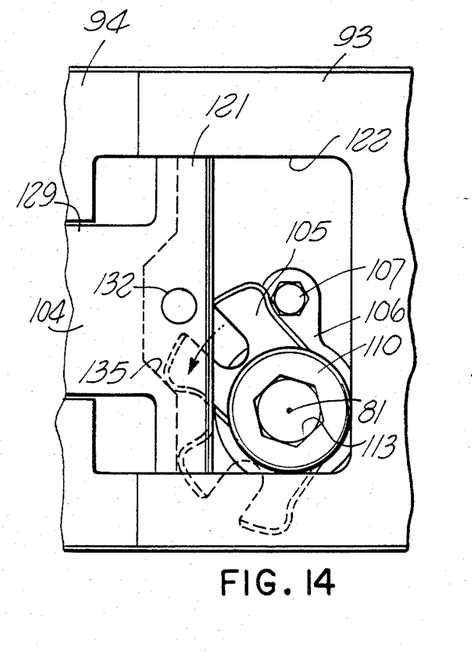

It will of course be understood that if it is desired to manually actuate the valve from its closed condition to its open condition when the parts are in the FIG. 14 position, this may be done by merely inserting a hexagonal allen wrench into socket recess 113 and then turning the crank arm and valve through 90° in a counterclockwise direction, initially deflecting portion 121 of member 104 leftwardly as in FIG. 15 to allow the crank arm to swing freely to a position such as the broken line position of FIG. 14 without interference being offered by the camming and actuating member 104. The sleeve segment 93 is recessed at 146 (FIGS. 7 and 8) above crank arm 105 to allow room for the crank arm to swing upwardly to the broken line position of FIG. 15, and a similar recess is provided in section 93 beneath the crank arm to allow room for its to swing to the broken line position of FIG. 14.

While a certain specific embodiment of the present invention has been disclosed as typical, the invention is of course not limited to this particular form, but rather is applicable broadly to all such variations as fall within the scope of the appended claims.

We claim:

1. A well pipe valve actuator comprising:

a tubular element to be connected to the upper end of a drill string and containing a passage through which fluid flows;

a valve within said tubular element actuable between an open position permitting fluid flow through said passage and a closed position preventing such flow;

a member for actuating said valve and which is mounted for pivotal movement about an axis relative to said tubular element to open and close the valve;

a part mounted near said member for movement between first and second positions relative to said tubular element and which is engageable with said member in an interfitting relation pivoting said member to open the valve upon movement of said part to said first position thereof, and pivoting said member to close the valve upon movement of said part to said second position thereof;

powered means for moving said part to open and close the valve; and manual override means enabling said member to be pivoted manually to open and close the valve without actuation of said powered means;

said part being constructed and mounted to move out of interfitting relation with respect to said member upon arrival at at least one of said first and second positions of said part to avoid interferences by said part with manual actuation of the valve.

2. A well pipe valve actuator as recited in claim 1, in which said part, when in said interfitting relation with said member, is received at least partially within a recess in said member in a relation to move said member pivotally, and is movable out of said recess upon attainment of said one of said first and second positions of the part.

3. A well pipe valve actuator as recited in claim 1, in which said member is an arm pivoting about said axis and having an end portion containing a recess opening essentially radially outwardly away from said axis, said part, when in said interfitting relation with said member, being received within said recess, and being movable out of said recess upon arrival at each of said first and second positions of said part.

4. A well pipe valve actuator as recited in claim 1, including a carrier structure carried at the outside of said tubular element and which is actuable upwardly and downwardly relative thereto by said powered means, and which carries said part to move it upwardly and downwardly between said first and second positions of the part.

5. A well pipe valve actuator as recited in claim 4, in which said powered means include piston and cylinder means offset laterally from said tubular element, and lever means connected operatively to said carrier structure and said piston and cylinder means and actuable by said piston and cylinder means to move said carrier structure upwardly and downwardly.

6. A well pipe valve actuator as recited in claim 1, including yieldingly urged cam means positioned to act against said member after movement of said part out of interfitting relation therewith in said one of said first and second positions of said part to yieldingly urge said member pivotally in a direction assuring full actuation of the valve to a corresponding one of said open and closed positions thereof.

7. A well pipe valve actuator as recited in claim 1, including a cam structure which is movable between said first and second positions with said part and is yieldingly urged in a relation to engage said member when said part is in one of said positions thereof in a relation urging said member to a corresponding one of said open or closed positions of the valve.

8. A well pipe valve actuator as recited in claim 1, in which said member is an arm containing a recess facing essentially radially outwardly away from said pivotal axis of said member, with said part being receivable within said recess in said interfitting relation of the part and member and being movable out of said recess in said first and second positions of the member, there being a cam structure connected to said part for movement therewith between said first and second positions of the part and having cam surfaces operable to deflect said arm in a relation assuring complete closure of the valve or complete opening of the valve in said first and second positions of said part, and spring means yieldingly urging said cam structure to fully close or fully open the valve.

9. A well pipe valve actuator as recited in claim 8, in which said cam structure is constructed to be deflected by said arm to a position avoiding interference by the cam structure with manual actuation of the valve when said part is in either of said first or second positions thereof.

10. A well pipe valve actuator comprising:
a tubular element to be connected to the upper end of a drill string and centered essentially about a first axis and containing a passage through which fluid flows;
a valve within said tubular element actuable between an open position permitting fluid flow through said passage and a closed position preventing such flow;
an arm at the outside of said tubular element for actuating said valve and mounted to swing about a second axis extending generally transversely of said first axis to open and close the valve;
a carrier sleeve disposed about said tubular element and movable upwardly and downwardly relative thereto;
a structure carried by said sleeve for upward and downward movement therewith and movable relative to said sleeve essentially toward and away from said second axis;
yielding means urging said structure toward said second axis;
said structure having an actuating portion which is engageable with said arm in an interfitting relation pivoting said arm to actuate the valve between open and closed positions upon upward and downward movement of said sleeve and said structure between an upper position of the sleeve and said structure and a lower position thereof;
powered means for actuating said sleeve upwardly and downwardly between said upper and lower positions;
said arm having manual override means enabling it to be pivoted manually to open and close the valve without actuation of said powered means;
said actuating portion of said structure being constructed and mounted to move out of said interfitting relation with respect to said arm in said upper position of said sleeve and structure and in said lower position of said sleeve and structure to enable manual pivotal movement of said arm and actuation of the valve without vertical actuation of said sleeve by said powered means;
said structure having cam surfaces engageable with said arm in said upper and lower positions of the sleeve and structure to yieldingly urge said arm to fully close or fully open the valve.

11. A well pipe valve actuator as recited in claim 10, in which said structure contains a recess into which said arm projects and which is defined at its upper and lower ends by said cam surfaces, with said surfaces disposed at opposite inclinations with respect to the horizonal to engage and actuate the arm in opposite pivotal directions upon arrival of the sleeve and structure at said upper and lower positions respectively.

12. A well pipe valve actuator as recited in claim 11, in which said arm contains a recess at its extremity facing essentially away from said second axis and within which said actuating portion of said structure is received in said interfitting relation, and out of which said actuating portion is movable in said upper and lower positions of said sleeve and structure.

13. A well pipe valve actuator as recited in claim 12, in which said arm and said structure are constructed to effect deflection of said structure essentially away from said second axis and against the resistance of said yielding means upon manually effected swinging movement of the arm to permit such manual swinging movement.

14. A well pipe valve actuator as recited in claim 13, including rollers carried by said sleeve and engageable with said tubular element to guide and locate the sleeve for upward and downward movement relative to the tubular element.

15. A well pipe valve actuator as recited in claim 10, in which said sleeve is formed as a plurality of arcuate sections disposed about said tubular element and interconnected for relative swinging movement to open and close the sleeve for placement about the tubular element.

16. A well pipe valve actuator as recited in claim 15, in which said powered means include at least one piston and cylinder mechanism offset to a side of said first axis, and a lever structure connected operatively to and actuable by said piston and cylinder mechanism and engaging an essentially annular relatively rotating portion of said sleeve to actuate it upwardly and downwardly relative to said tubular element.

17. A well pipe valve actuator comprising:
a tubular element to be connected to the upper end of a drill string and containing a passage through which fluid flows;
a valve within said tubular element actuable between an open position permitting fluid flow through said passage and a closed position preventing such flow;
a member for actuating said valve and which is mounted for pivotal movement relative to said tubular element to actuate the valve between said positions;
a carrier at the outside of said tubular element movable upwardly and downwardly to operate said member;
powered means for moving said carrier upwardly and downwardly;
first actuating means movable upwardly and downwardly with said carrier and engaging said member in a relation to pivot the member in a relation actuating the valve between said positions thereof upon vertical movement of the carrier; and
additional actuating means movable upwardly and downwardly with said carrier and said first actuating means and having cam surfaces engageable with said member in upper and lower positions of the carrier and yieldingly urged in a direction to yieldingly pivot said member to the fully open and fully closed positions of the valve in said upper and lower positions of said carrier.

18. A well pipe valve actuator as recited in claim 17, in which said additional actuating means include a structure mounted to said carrier for upward and downward movement therewith and yieldingly urged generally horizontally relative thereto toward the axis of pivotal movement of said member, said member including an arm swinging about said pivotal axis and projecting into a recess in said structure, said cam surfaces being formed at upper and lower ends of said recess and being inclined oppositely with respect to one another to engage said arm in upper and lower positions of the carrier.

19. The combination comprising:
a top drive drilling unit including a housing, a tubular element rotatable relative to said housing and connectable to the upper end of a drill string, and a motor carried by said housing for driving said tubular element to turn the string;
an elongated support member connected to said drilling unit and projecting downwardly lower than said housing;
said tubular element being formed separately from said support member and being rotatable relative thereto by said motor;
a first piston and cylinder mechanism suspended from a lower portion of said support member;
a torque wrench for making and breaking joints in the drill string and which is suspended by said piston and cylinder mechanism and is actuable upwardly and downwardly thereby;
at least one additional piston and cylinder mechanism suspended by said support member at a location spaced lower than said housing;
a valve for closing off the flow of fluid through said drill string; and
means actuable by said additional piston and cylinder mechanism to open and close said valve.

20. The combination comprising:
a top drive drilling unit including a housing, a tubular element rotatable relative to said housing and connectable to the upper end of a drill string, and a motor carried by said housing for driving said tubular element to turn the string;
an elongated support member connected to said drilling unit and projecting downwardly lower than said housing;
a first piston and cylinder mechanism suspended from a lower portion of said support member;
a torque wrench for making and breaking joints in the drill string and which is suspended by said piston and cylinder mechanism and is actuable upwardly and downwardly thereby;
at least one additional piston and cylinder mechanism suspended by said support member at a location spaced lower than said housing;
a valve for closing off the flow of fluid through said drill string; and
means actuable by said additional piston and cylinder mechanism to open and close said valve;
said tubular element of the top drive drilling unit having a tubular extension projecting downwardly therefrom and containing said valve;
said means including a sleeve disposed about said tubular extension and movable upwardly and downwardly relative thereto and operable by such upward and downward movement to actuate said valve, and at least one lever structure actuable by said additional piston and cylinder mechanism and having a portion engaging an essentially annular relatively rotatable portion of said sleeve to actuate the sleeve upwardly and downwardly.

21. The combination as recited in claim 20, including a frame attached to said torque wrench and movable upwardly and downwardly therewith and projecting upwardly past said first piston and cylinder mechanism and said additional piston and cylinder mechanism and containing an opening through which said elongated support member extends in a relation guiding and locating said frame for relative upward and downward movement.

* * * * *